(12) United States Patent
Gallegos-Lopez et al.

(10) Patent No.: US 8,359,131 B2
(45) Date of Patent: Jan. 22, 2013

(54) METHOD AND SYSTEM FOR OPERATING AN ELECTRIC MOTOR

(75) Inventors: Gabriel Gallegos-Lopez, Torrance, CA (US); Silva Hiti, Redondo Beach, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 338 days.

(21) Appl. No.: 12/732,003

(22) Filed: Mar. 25, 2010

(65) Prior Publication Data

US 2011/0238245 A1    Sep. 29, 2011

(51) Int. Cl.
*B60L 9/00* (2006.01)
(52) U.S. Cl. ............................................. 701/22
(58) Field of Classification Search ............. 701/22
See application file for complete search history.

(56) References Cited

U.S. PATENT DOCUMENTS

| | | | |
|---|---|---|---|
| 2008/0079377 A1* | 4/2008 | Williams et al. | 318/400.17 |
| 2010/0019705 A1* | 1/2010 | Kimura | 318/400.3 |
| 2010/0171456 A1* | 7/2010 | Chakrabarti et al. | 318/461 |
| 2011/0285332 A1* | 11/2011 | Pollock et al. | 318/400.02 |

OTHER PUBLICATIONS

Bojoi, R. et al.: Computation and Measurements of the DC Link Current in Six-Phase Voltage Source PWM Inverters for AC Motor Drives. 2002, pp. 953-958, Torino, Italy, IEEE [online: URL: http://www.polito.it/research/eeeee/].

Dahono, P.A., Analysis and Minimization of Input Current and Voltage Ripples of Five-Phase PWM Inverters, 2nd IEEE International Conference on Power and Energy, Dec. 1-3, 2008, pp. 625-629, Johor Baharu, Malaysia.

Huang, Jing et al., Extending Voltage Range and Reducing Torque Ripple of Five-Phase Motor Drives With Added Voltage Harmonics. 28.2.2008, IEEE [online].

Iqbal, A., Space Vector Modulation Schemes for a Five-Phase Voltage Source Inverter, Liverpool John Moores University, School of Engineering, 2005, IEEE [online].

German Office Action mailed Jul. 28, 2011 for German Patent Application No. 10 2011 002 466.2.

* cited by examiner

Primary Examiner — Mary Cheung
Assistant Examiner — Michael D Lang
(74) Attorney, Agent, or Firm — Ingrassia Fisher & Lorenz, P.C.

(57) ABSTRACT

Methods and systems for operating an electric motor having a plurality of windings with an inverter having a plurality of switches coupled to a voltage source are provided. A first plurality of switching vectors is applied to the plurality of switches. The first plurality of switching vectors includes a first ratio of first magnitude switching vectors to second magnitude switching vectors. A direct current (DC) current associated with the voltage source is monitored during the applying of the first plurality of switching vectors to the plurality of switches. A second ratio of the first magnitude switching vectors to the second magnitude switching vectors is selected based on the monitoring of the DC current associated with the voltage source. A second plurality of switching vectors is applied to the plurality of switches. The second plurality of switching vectors includes the second ratio of the first magnitude switching vectors to the second magnitude switching vectors.

20 Claims, 5 Drawing Sheets

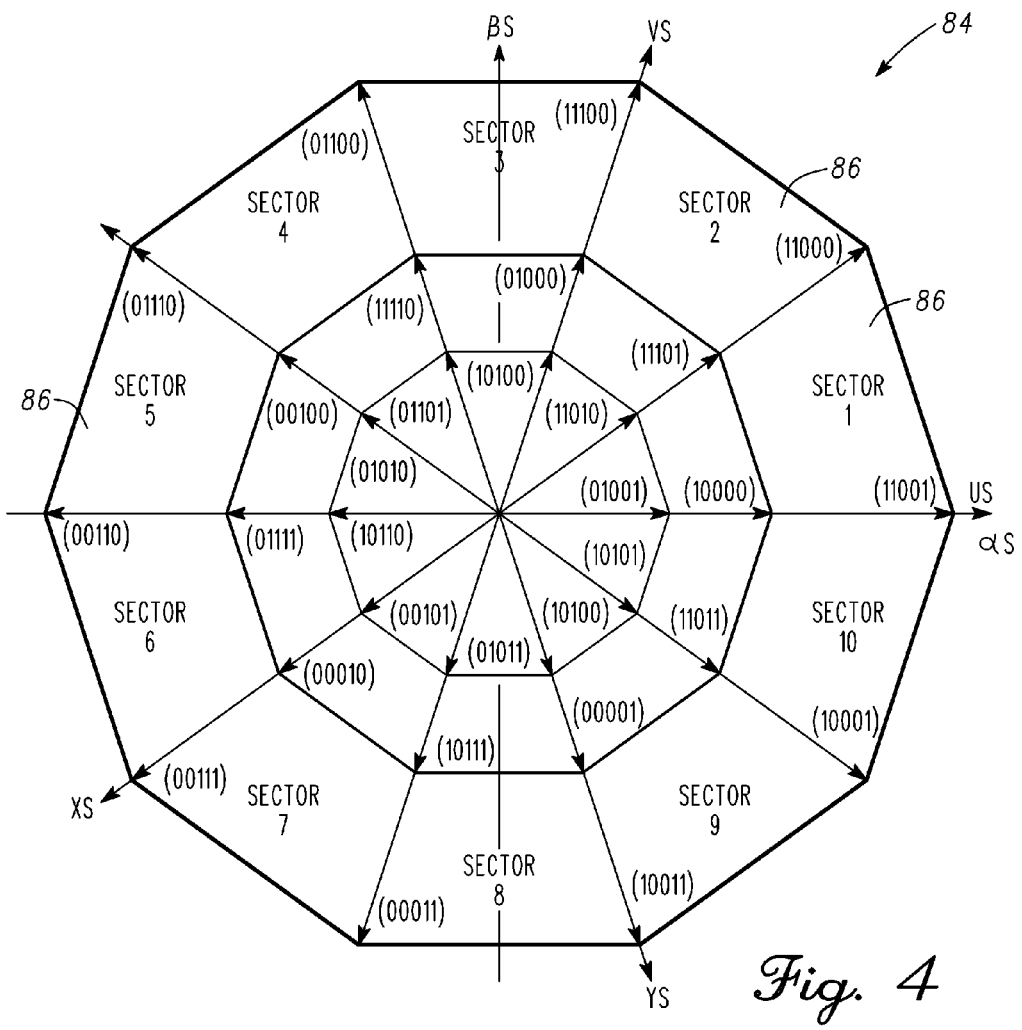
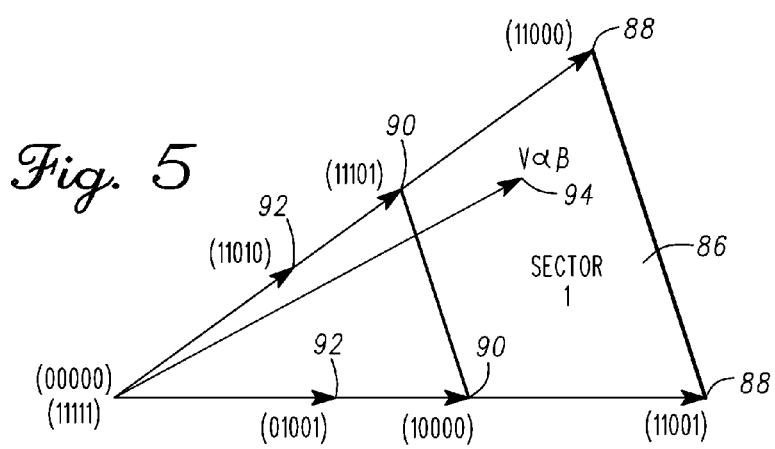
Fig. 4
Fig. 5

METHOD AND SYSTEM FOR OPERATING AN ELECTRIC MOTOR

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

The present invention generally relates to electric motors. More specifically, the present invention relates to methods and systems for operating an electric motor, such as a high-phase electric motor used in a propulsion system of an automobile.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries perhaps in combination with another actuator to drive the wheels.

Such vehicles often use two separate voltage sources, such as a battery and a fuel cell, to power the electric motors that drive the wheels. Power electronics (or power electronics systems), such as direct current-to-direct current (DC/DC) converters, are typically used to manage and transfer the power from the two voltage sources. Also, due to the fact that alternative fuel automobiles typically include direct current (DC) power supplies, direct current-to-alternating current (DC/AC) inverters (or power inverters) are also provided to convert the DC power to alternating current (AC) power.

To date, most automotive propulsion systems have utilized three-phase systems. However, higher phase number (e.g., five-phase) systems have recently been developed which may provide lower torque ripple, improved power and torque, increased fault tolerance over lower phase number (e.g., three-phase) systems. As the power demands on the electrical systems in alternative fuel vehicles continue to increase, there is an ever-increasing need to maximize the electrical efficiency of such systems. There is also a constant desire to reduce the size of the components within the electrical systems in order to minimize the overall cost and weight of the vehicles.

Accordingly, it is desirable to provide improved methods and systems for operating an electric motor, particularly high-phase number electric motors for use in automotive electrical systems. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for operating an electric motor having a plurality of windings with an inverter having a plurality of switches coupled to a voltage source is provided. A first plurality of switching vectors is applied to the plurality of switches. The first plurality of switching vectors includes a first ratio of first magnitude switching vectors to second magnitude switching vectors. A direct current (DC) current associated with the voltage source is monitored during the applying of the first plurality of switching vectors to the plurality of switches. A second ratio of the first magnitude switching vectors to the second magnitude switching vectors is selected based on the monitoring of the DC current associated with the voltage source. A second plurality of switching vectors is applied to the plurality of switches. The second plurality of switching vectors includes the second ratio of the first magnitude switching vectors to the second magnitude switching vectors.

An automotive electrical system is provided. The automotive electrical system includes an electric motor having at least five windings, an inverter having a plurality of switches coupled to the at least five windings, a voltage source coupled to the plurality of switches, a current sensor coupled to the voltage source and configured to detect a DC current associated with the voltage source and generate a signal representative thereof, and a processor in operable communication with the plurality of switches and the current sensor. The processor is configured to apply a first plurality of switching vectors to the plurality of switches, the first plurality of switching vectors including a first ratio of first magnitude switching vectors to second magnitude switching vectors, select a second ratio of the first magnitude switching vectors to the second magnitude switching vectors based on the DC current associated with the voltage source, and apply a second plurality of switching vectors to the plurality of switches, the second plurality of switching vectors including the second ratio of the first magnitude switching vectors to the second magnitude switching vectors.

An automotive propulsion system is provided. The automotive electrical system includes an electric motor comprising at least five windings, a DC voltage supply, a direct current-to-alternating current (DC/AC) power inverter comprising at least five pairs of power switching devices coupled to the at least five windings and the DC voltage supply, and a processor in operable communication with the electric motor, the DC voltage supply, and the DC/AC power inverter. The processor is configured to apply a first plurality of switching vectors to the at least five pairs of power switching devices, the first plurality of switching vectors including a first ratio of first magnitude switching vectors to second magnitude switching vectors, select a second ratio of the first magnitude switching vectors to the second magnitude switching vectors based on a DC current associated with the DC voltage supply, and apply a second plurality of switching vectors to the at least five power switching devices, the second plurality of switching vectors including the second ratio of the first magnitude switching vectors to the second magnitude switching vectors.

DESCRIPTION OF THE DRAWINGS

The present invention will hereinafter be described in conjunction with the following drawing figures, wherein like numerals denote like elements.

FIG. 4 illustrates a stationary frame of reference coordinate system illustrating a method for controlling an electric motor and an inverter having five-phases;

FIG. 5 illustrates one sector of the stationary frame of reference coordinate system of FIG. 4;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-7 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 7 illustrate methods and systems for operating an electric motor with an inverter are provided. The electric motor has multiple windings (e.g., at least five), and the inverter has a plurality of switches coupled to a voltage source. A first plurality of switching vectors is applied to the plurality of switches. The first plurality of switching vectors includes a first ratio of first magnitude (e.g., large) switching vectors to second magnitude (e.g., medium) switching vectors. A direct current (DC) current (e.g., DC current ripple) associated with the voltage source is monitored during the applying of the first plurality of switching vectors to the plurality of switches. The monitored DC current is used to select a second ratio of the first magnitude switching vectors to the second magnitude switching vectors. A second plurality of switching vectors is applied to the plurality of switches. The second plurality of switching vectors includes the second ratio of the first magnitude switching vectors to the second magnitude switching vectors.

Figure 1:
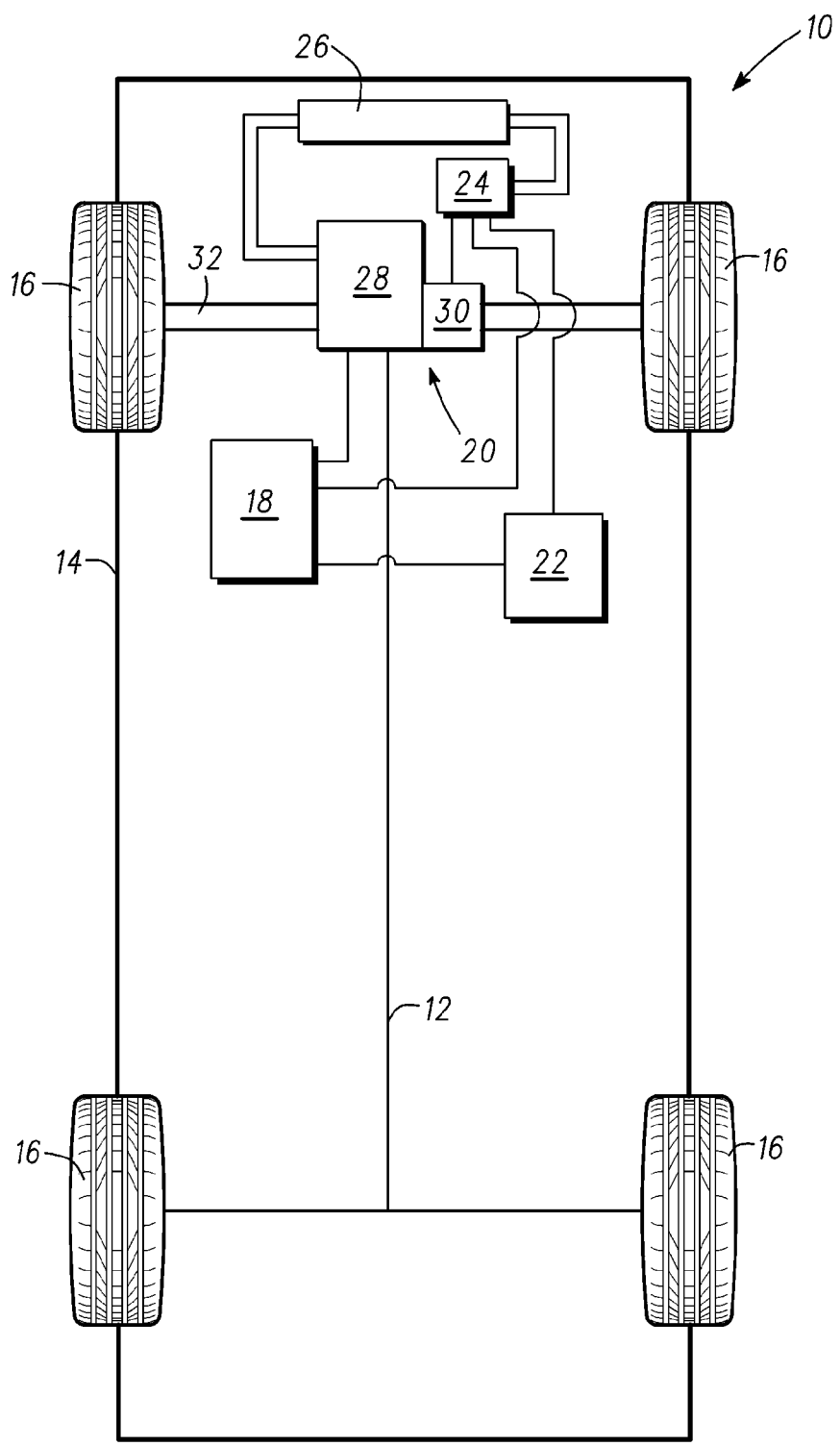
FIG. 1 is a schematic of an exemplary automobile.

FIG. 1 is a schematic view of a vehicle (or "automobile" or automotive propulsion system) 10, according to an embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

The automobile 10 in FIG. 1 is an HEV, and further includes an actuator assembly 20, a battery (or a DC power or voltage supply) 22, a power electronics assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In an embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24.

Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the battery 22, and the inverter 24. Although not shown in detail, the electronic control system 18 includes various sensors and automotive control modules, or electronic control units (ECUs), such as an inverter control module, a motor controller, and a vehicle controller, and at least one processor (or processing system) and/or a memory having instructions stored thereon (or in another computer-readable medium) for carrying out the processes and methods as described below.

Figure 2:
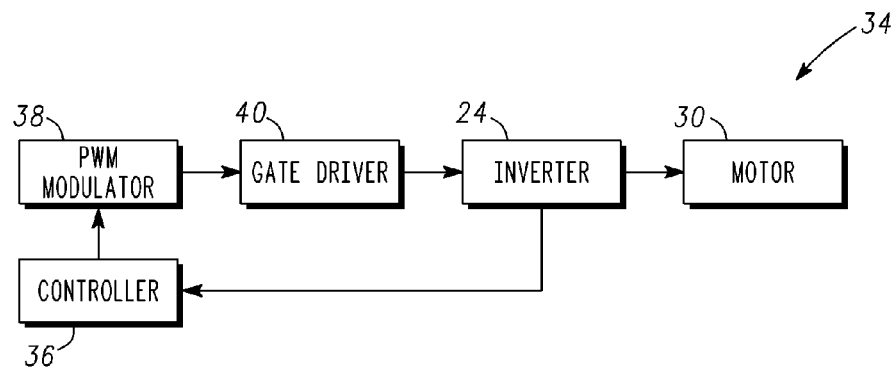
FIG. 2 is a block diagram of an inverter control system within the automobile of FIG. 1.

Referring to FIG. 2, a generic, exemplary inverter control system (or electric drive system) 34 is shown. The inverter control system 34 includes a controller (or processor) 36 in operable communication with a Pulse Width Modulation (PWM) modulator 38 (or a pulse width modulator) and the inverter 24 (at an output thereof). The PWM modulator 38 is coupled to a gate driver 40, which in turn has an output coupled to an input of the inverter 24. The inverter 24 has a second output coupled to the motor 30. The controller 36 and the PWM modulator 38 may be integral with the electronic control system 18 shown in FIG. 1.

Figure 3:
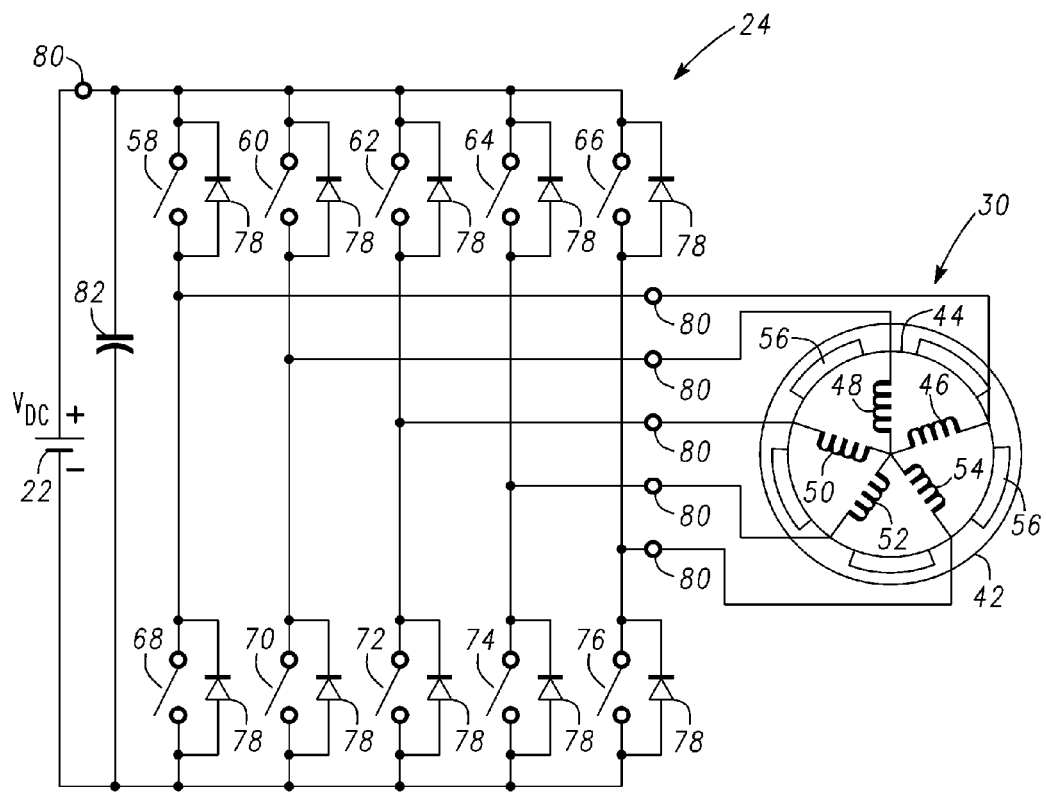
FIG. 3 is a schematic of a power inverter, a voltage supply, and an electric motor within the automobile of FIG. 1.

FIG. 3 schematically illustrates the battery (and/or DC voltage source) 22, the inverter 24 (or power converter), and the motor 30 of FIGS. 1 and 2 in greater detail. In the depicted embodiment, the inverter 24 and the electric motor are "five-phase" components, as is commonly understood. The inverter 24 includes a five-phase circuit coupled to the motor 30. More specifically, the inverter 24 includes a switch network having a first input coupled to the battery 22 (i.e., a voltage source ($V_{DC}$)) and an output coupled to the motor 30. Although a single voltage source is shown, a distributed DC link with two or more series sources may be used.

As will be appreciated by one skilled in the art, the electric motor 30, in one embodiment, is a permanent magnet electric motor and includes a stator assembly 42 (including conductive coils or windings) and a rotor assembly 44 (including a ferromagnetic core and/or magnets), as well as a transmission and a cooling fluid (not shown). The stator assembly 42 includes a plurality (e.g., five) conductive coils or windings 46, 48, 50, 52, and 54 each of which is associated with one of five phases of the electric motor 30, as is commonly understood. The rotor assembly 44 includes a plurality of magnets 56 and is rotatably coupled to the stator assembly 42, as is commonly understood. The magnets 56 may include multiple (e.g., sixteen) electromagnetic poles, as is commonly understood. The magnets 56 may be embedded in the rotor, which is commonly called Interior Permanent Magnet (IPM) machine. It should be understood that the description provided above is intended only as an example of one type of electric motor that may be used.

The switch network within the inverter 24 includes five pairs of series power controllable switching devices (or switches or components) with antiparallel diodes (i.e., antiparallel to each switch), each of which corresponds to a phase of the motor 30. Each of the pairs of series switches comprises a first controllable switch, or transistor, (i.e., a "high" switch) 58, 60, 62, 64, and 66 and a second controllable switch (i.e., a "low" switch) 68, 70, 72, 74, and 76. Each of the first controllable switches 58-66 has a first terminal coupled to a positive electrode of the voltage source 22. Each of the second controllable switches 68-76 has a second terminal coupled to a negative electrode of the voltage source 22 and a first terminal coupled to a second terminal of the respective first controllable switch 58-66. That is, the controllable switches in each pair (e.g., switch 58 and switch 68) are connected in series.

As is commonly understood, the controllable switches 58-76 may be in the form of individual semiconductor devices such as insulated gate bipolar transistors (IGBTs) within integrated circuits formed on semiconductor (e.g. silicon) substrates (e.g., die). As shown, a diode 78 is installed in an antiparallel configuration (i.e., a "flyback" or "freewheeling" diode) to each of the switches 58-76. As such, each of the switches 58-76 and the respective diode 78 may be understood to form a switch-diode pair or set, ten of which are included in the embodiment shown.

Still referring to FIG. 3, the inverter 24 and/or the motor 30 includes a plurality of current sensors 80 configured to detect the flow of current through the windings 46-54 of the motor 30 (and/or through the respective pair of switches 58-76 or diodes 78), as well as from the voltage source 22. In one embodiment, the current sensors 80 are Hall Effect sensors. Other examples of current sensors include resistive shunt type sensors and magneto-resistive type sensors. The inverter 24 also includes a DC capacitor 82 connected in parallel with the voltage source 22 and/or across the positive and negative terminals of the voltage source 22 (i.e., across the DC link).

Referring to FIG. 1, during normal operation (i.e., driving), the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the switches 58-76 within the inverter 24 at an operating (or switching) frequency, such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the motor 30. The inverter control system 34 of FIG. 2 consists of multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 40 generate the necessary gate pulses (or duty cycles) which are sent to the inverter 24 to control the electric motor 30 to the desired speed and/or torque.

As will be appreciated by one skilled in the art, the operation of the controllable switches 58-76 (FIG. 3) causes current to flow through the windings 46-54 in the motor 30. The interaction of this current with the magnetic fields generated by the magnets 56 causes a Lorentz force to be generated, thus causing the rotor 44 to rotate relative to the stator 42, which in turn provides torque/power to the wheels 16.

According to one aspect of the present invention, DC current ripple across the DC link is monitored and used to adjust the switching scheme used by the inverter 24 to drive the motor 30. As described above, the inverter 24 and the motor 30 are, at least in the depicted embodiment, five-phase electronic components. That is, the inverter 24 includes five sets (or pairs) of switches, each of which is associated with a respective winding 46-54 of the motor 30.

As will be appreciated by one skilled in the art, the operation of such a five-phase system may be represented by a stationary frame (with respect to the stator 42 of the motor 30) of reference coordinate system (i.e., $\alpha s$-$\beta s$) 84, such as that shown in FIG. 4. As shown, the coordinate system 84 may be divided into ten sectors 86 (which are individually textually labeled in FIG. 4). FIG. 5 illustrates one of the sectors 86 (i.e., Sector 1) in greater detail.

The sectors 86 are each bounded on each side, and separated from one another, by three "voltage vectors": large voltage vectors 88, medium voltage vectors 90, and small voltage vectors 92. Still referring to FIG. 5, each of the voltage vectors 88, 90, and 92 are associated with a corresponding switching vector, which is represented in parentheses (e.g., 11000).

As is commonly understood, the switching vectors 88, 90, and 92 each refer to a particular operational mode of the inverter 24. More particularly, the switching vectors refer to specific operational arrangements of the individual switches 58-76 (FIG. 3). Each digit in the switching vectors indicates the operational mode of the "high" switch within a particular pair of the switches 58-76. For example, switching vector "11000" refers to the operational state of the inverter 24 in which switches 58 and 60 are activated (or ON) and switches 62, 64, and 66 are deactivated (or OFF). As is commonly understood, in order to prevent shorting, the "low" switch in each pair may be in the opposite operational state as the "high" switch. Therefore, when switching vector "11000" is applied to the inverter 24, switches 68 and 70 are OFF and switches 72, 74, and 76 are ON. As such, each switching vector corresponds to a respective portion of the switches 58-76 being activated while the remaining switches are deactivated, and vice versa.

When used to operate the inverter 24, each of the voltage vectors 88, 90, and 92 and/or the associated switching vectors, causes a voltage to be applied across (and/or current to flow through) the windings 46-54. The large voltage vectors 88 cause a voltage of a first magnitude (i.e., large) to be applied. The medium voltage vectors 90 cause a voltage of a second magnitude (i.e., medium), which is smaller than the first magnitude, to be applied. The small voltage vectors 92 cause a voltage of a third magnitude (i.e., small), which is smaller than the second magnitude, to be applied.

Still referring to FIG. 5, when a particular stationary frame voltage is commanded ($V^{s*}_{\alpha\beta}$), which lies within a particular sector 86 (e.g., Sector 1), the particular voltage vectors 88, 90, and 92 (and/or the associated switching vectors) that bind that sector 86 are used to generate the commanded voltage by adjusting the duration each of the vectors 88, 90, and 92 are used (i.e., by adjusting the duty cycles of the switches). In one embodiment, only large voltage vectors 88 and medium voltage vectors 90 (and/or the associated switching vectors) are used. That is, none of the small voltage vectors 92 are used.

According to one aspect of the present invention, the ratio of large voltage vectors 88 to medium voltage vectors 90 used to operate the motor 30 is adjusted based on the DC current ripple detected on the DC link.

Figure 6:
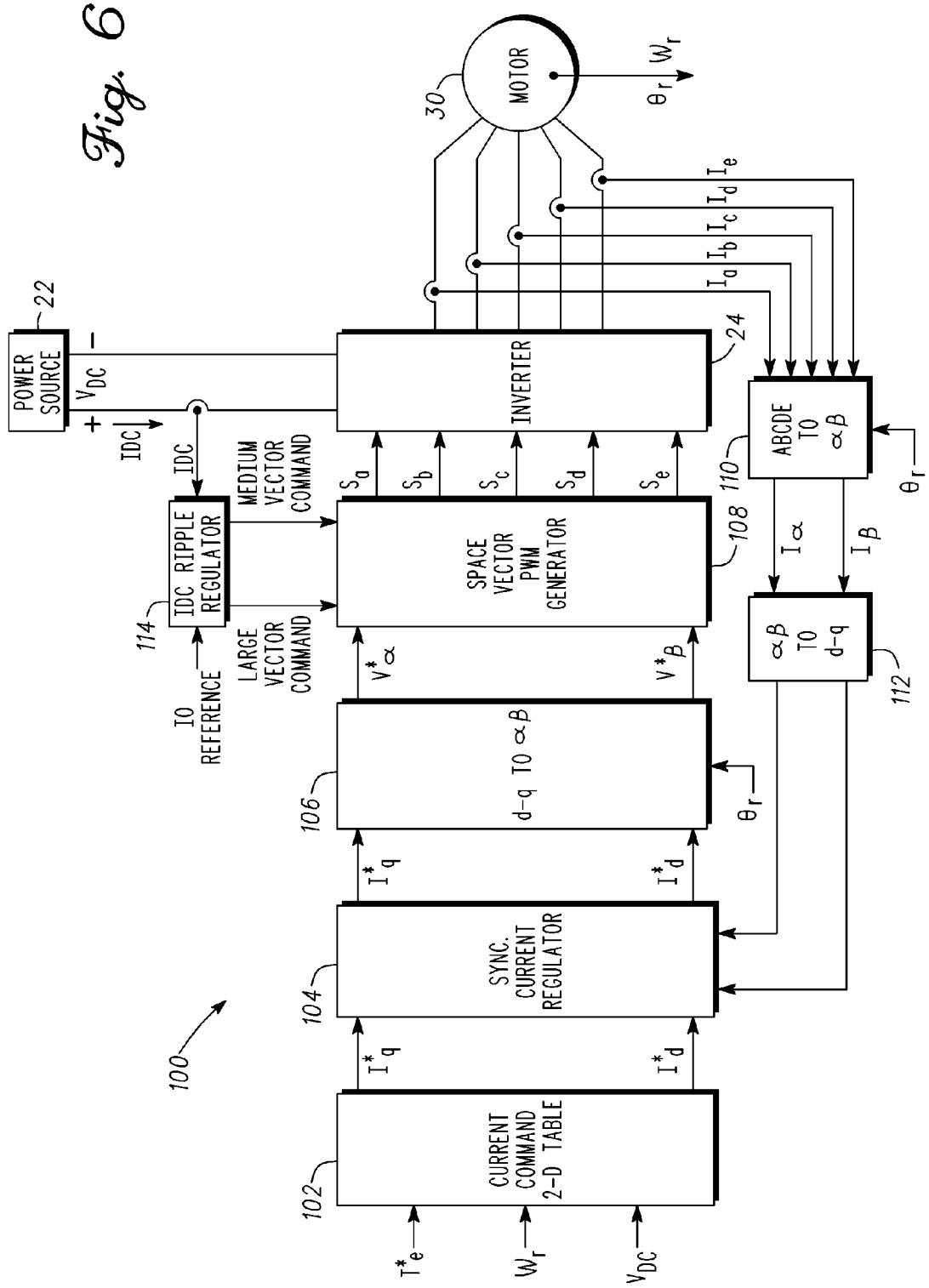
FIG. 6 is a block diagram of a method and/or system for operating an electric motor, according to an embodiment.

FIG. 6 illustrates a motor control system (and/or method) 100, according to one embodiment of the present invention. In one embodiment, the control system 100 is implemented within the electronic control system 18 (i.e., in the form of instructions stored on a computer-readable medium or "software"), particularly an inverter control module within the electronic control system 18. However, in other embodiments, portions of the control system 100 may be implemented as hardware, such as circuitry utilizing discrete electronic components.

As will be appreciated by one skilled in the art, the system 100 operates as a torque controller for the motor 30. A current command block 102 receives a torque command (T*), the angular speed of the motor ($\omega_r$) (e.g., determined using a resolver), and an available voltage from the voltage source ($V_{dc}$). The current command block 102 uses, for example, a look-up table stored on a computer-readable medium within the electronic control system to generate commanded synchronous frame currents ($I^*_q$, $I^*_d$). The synchronous frame currents are then sent to a current regulator 104, as are sensed synchronous frame currents ($I_q$, $I_d$), described in greater detail below.

Although not shown, within the current regulator 104, the synchronous frame currents are received by respective summation circuits (or summers), each of which subtracts a sensed synchronous frame current from the respective commanded current. The differences between the commanded and sensed synchronous frame currents (i.e., the errors) are sent to proportional-integral (PI) controllers. As will be appreciated by one skilled in the art, PI controllers are feedback loop components that take a measured value (or output) from a process or other apparatus and compare it with a set, or reference, value. The difference (or "error" signal) is then used to adjust an input to the process in order to bring the output to its desired reference value. The PI controllers may include a proportional term and an integral term. The proportional term is used to account for the "immediate" or present error, which is multiplied by a constant. The integral term integrates the error over a period of time and multiplies the integrated sum by another constant.

As such, the PI controllers receive the present current error from summation circuits and generate signals that are representative of a combination of the present current error and the current error over a period of time. The outputs of the PI controllers are sent to a second set of summation circuits, respectively, which also receive, in one embodiment, decoupling voltage/feedforward terms. The summation circuits add the outputs of PI controllers to the respective decoupling voltages and outputs commanded synchronous frame voltages ($V^*_q$, $V^*_d$) to a phase conversion block 106.

The phase conversion block 106 uses the synchronous frame voltages, along with the angular position of the motor ($\theta_r$), to generate two-phase stationary frame voltages ($V^*_\alpha$, $V^*_\beta$). The stationary frame voltages are sent to a pulse width modulation (PWM) generator 108 which converts the two-phase stationary frame voltages into five-phase voltages and/or gate pulses (or duty cycles) ($S_a$, $S_b$, $S_c$, $S_d$, $S_e$), which are then sent to the inverter 24 and used to operate the switches 58-76 (FIG. 3) and thus drive the motor 30.

During operation, the current sensors 80 provide signals representative of the sensed current flowing through various parts of the system, including the windings 46-54 ($I_a$, $I_b$, $I_c$, $I_d$, $I_e$). The winding currents are converted from five-phase to two-phase at conversion block 110, converted into the synchronous frame of reference using angular position of the motor ($\theta_r$) at conversion block 112, and sent to the current regulator block 104.

Still referring to FIG. 6, the motor control system 100 also includes a current ripple regulator 114. The current ripple regulator 114 receives a DC link current ($I_{dc}$) from the current sensor 80 coupled to the DC link (FIG. 3) and a reference current ($I_{O\,Reference}$) from memory and provides a large vector command and a medium vector command to the PWM generator 108.

Figure 7:
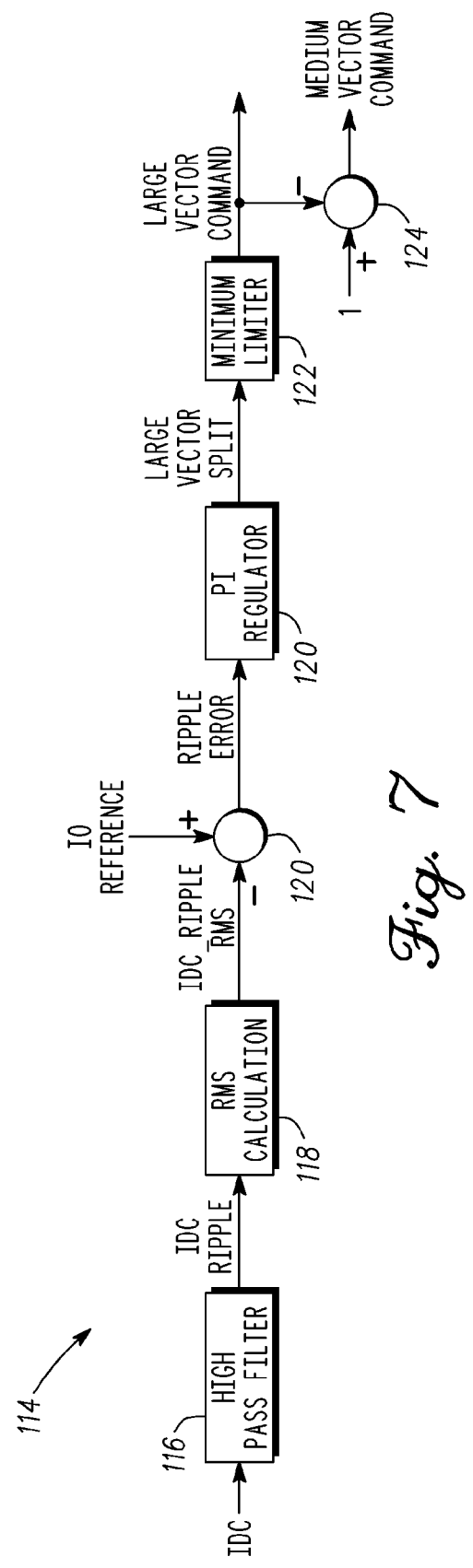
FIG. 7 is a block diagram of a current ripple regulator within the method and/or system of FIG. 6.

FIG. 7 illustrates the current ripple regulator 114 in greater detail. As shown, the DC link current ($I_{dc}$) is received by a high pass filter 116 which filters out any relatively constant DC offset current and outputs the current ripple ($I_{dc\_ripple}$) to a root mean square (RMS) calculation block 118. The RMS current ripple ($I_{dc\_ripple\,RMS}$) is sent to a summation circuit (or summer) 120 where it is subtracted from the reference current. The reference current may be set to "0," which represents operation of the inverter 24 with no current ripple. The output of summer 120, a current ripple error (Ripple Error), is sent to a PI regulator 120.

The PI regulator 120 may operate in a manner similar to those described above such that its output signal is representative of the error between the RMS current ripple and the reference current. In one embodiment, this error corresponds to the "large vector split," as described in greater detail below. The large vector split is sent to a minimum limiter 122 before being sent to the PWM generator 108 and a summer 124 (Large Vector Command). Summer 124 subtracts the limited large vector split from 1 to determine the "medium vector split," which is also sent to the PWM generator 108 (Medium Vector Command).

The large vector split (Large Vector Command) and the medium vector split (Medium Vector Command) are used by the PWM generator 108 to determine the ratio of large voltage vectors 88 to medium voltage vectors 90 (FIG. 5), or the equivalent percentages, that are used to drive the motor 30. In one embodiment, no small voltage vectors 92 are used.

Still referring to FIG. 7, the current ripple regulator 114 responds to changes in the DC link current ($I_{dc}$) by adjusting the large vector split and medium vector split, or more simply, the ratio of large voltage vectors to medium voltage vectors. For example, the PWM generator 108 may begin with 100% large voltage vectors and 0% medium voltage vectors. The current ripple regulator 114 automatically decreases the ratio of large voltage vectors to medium voltage vectors based on changes in the ripple current. An increase in the current ripple results in an increase in the ripple error, as well as the output of the PI regulator 120, which corresponds to the large vector split. As the large vector split decreases the medium vector split increases. Likewise, a decrease in the current ripple results in a decrease in the large vector split and an increase in the medium vector split.

However, the minimum limiter 122 prevents the large vector split from falling below a predetermined threshold. The threshold may be determined during testing before the system is installed in the automobile 10 (FIG. 1). The predetermined threshold may correspond to approximately 70% large voltage vectors and 30% medium voltage vectors. In one embodiment, the current ripple is minimized using approximately 75% large voltage vectors and 25% medium voltage vectors or a ratio of large voltage vectors to medium voltage vectors of approximately 3:1.

It should be understood that the large vector split that minimizes current ripple may change over the life of the system due to changes in performance characteristics. For example, if the PWM generator 108 begins with 100% large voltage vectors (or a first ratio), operation may settle at 75% large voltage vectors (a second ratio) after several minutes of use. However, after months of use, current ripple may be minimized at a different ratio, such as 80% large voltage vectors.

In another embodiment, operation may begin at, for example, at 50% large voltage vectors and 50% medium voltage vectors. The ratio is adjusted to determine whether an increase or a decrease in the large vector ratio is needed to reduce the DC current ripple. Once the trend is identified, the ratio is appropriately adjusted until the ripple current begins to increase again, which indicates that the minimum current ripple has been achieved.

The methods and systems described above may reduce DC link current ripple and voltage ripple, as well as DC capacitor ripple. DC capacitance may also be reduced, which allows for the use of a smaller capacitor. As a result, battery losses may be minimized and overall electrical performance may be improved.

Other embodiments may utilize source devices other than DC/AC inverters, such as DC/DC power converters, and load devices other than electric motors, such as batteries (e.g., lithium ion batteries). The system described above may be implemented in systems other than automobiles, such as watercraft and aircraft. The electric motor and the power inverter may have different numbers of phases (i.e., more than five). Other forms of power sources may be used, such as current sources and loads including diode rectifiers, thyristor converters, fuel cells, inductors, capacitors, and/or any combination thereof. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an electric motor having a plurality of windings with an inverter having a plurality of switches coupled to a voltage source, the method comprising:
   applying a first plurality of switching vectors to the plurality of switches, the first plurality of switching vectors comprising a first ratio of first magnitude switching vectors to second magnitude switching vectors;
   monitoring a direct current (DC) current associated with the voltage source during the applying of the first plurality of switching vectors to the plurality of switches;
   selecting a second ratio of the first magnitude switching vectors to the second magnitude switching vectors based on the monitoring of the DC current associated with the voltage source; and
   applying a second plurality of switching vectors to the plurality of switches, the second plurality of switching vectors comprising the second ratio of the first magnitude switching vectors to the second magnitude switching vectors.

2. The method of claim 1, wherein the applying of each of the first plurality of switching vectors and the applying of each of the second plurality of switching vectors comprises:
   activating a first portion of the plurality of switches; and
   deactivating a second portion of the plurality of switches.

3. The method of claim 2, wherein the applying of each of the first magnitude switching vectors causes a first voltage to be applied across at least one winding of the plurality of windings, the applying of each of the second magnitude switching vectors causes a second voltage to be applied across the at least one winding of the plurality of windings, and the first voltage is greater than the second voltage.

4. The method of claim 3, wherein the first plurality of switching vectors corresponds to a first plurality of voltage vectors on a stationary frame of reference coordinate system, and the second plurality of switching vectors corresponds to a second plurality of voltage vectors on the stationary frame of reference coordinate system.

5. The method of claim 4, wherein the inverter is configured to apply third magnitude switching vectors to the plurality of switches, the third magnitude switching vectors corresponding to a third voltage being applied across the at least one winding of the plurality of windings, and wherein the third voltage is less than the second voltage.

6. The method of claim 5, wherein the first plurality of switching vectors does not comprise any of the third magnitude switching vectors, and wherein the second plurality of switching vectors does not comprise any of the third magnitude switching vectors.

7. The method of claim 2, further comprising:
   monitoring the DC current associated with the voltage source during the applying of the second plurality of switching vectors to the plurality of switches;
   selecting a third ratio of the first magnitude switching vectors to the second magnitude switching vectors based on the monitoring of the DC current associated with the voltage source during the applying of the second plurality of switching vectors to the plurality of switches; and
   applying a third plurality of switching vectors to the plurality of switches, the third plurality of switching vectors comprising the third ratio of the first magnitude switching vectors to the second magnitude switching vectors.

8. The method of claim 7, wherein the monitoring the DC current associated with the voltage source during the applying of the first plurality of switching vectors to the plurality of switches comprises monitoring a DC current ripple, and the monitoring the DC current associated with the voltage source during the applying of the second plurality of switching vectors to the plurality of switches comprises monitoring the DC current ripple.

9. The method of claim 1, wherein the inverter is at least a five-phase inverter.

10. The method of claim 1, wherein the second ratio of the first magnitude switching vectors to the second magnitude switching vectors is approximately 3:1.

11. An automotive electrical system comprising:
an electric motor comprising at least five windings;
an inverter comprising a plurality of switches coupled to the at least five windings;
a voltage source coupled to the plurality of switches;
a current sensor coupled to the voltage source and configured to detect a direct current (DC) current associated with the voltage source and generate a signal representative thereof; and
a processor in operable communication with the plurality of switches and the current sensor, the processor being configured to:
apply a first plurality of switching vectors to the plurality of switches, the first plurality of switching vectors comprising a first ratio of first magnitude switching vectors to second magnitude switching vectors;
select a second ratio of the first magnitude switching vectors to the second magnitude switching vectors based on the DC current associated with the voltage source; and
apply a second plurality of switching vectors to the plurality of switches, the second plurality of switching vectors comprising the second ratio of the first magnitude switching vectors to the second magnitude switching vectors.

12. The automotive electrical system of claim 11, wherein the second ratio of the first magnitude switching vectors to the second magnitude switching vectors is approximately 3:1.

13. The automotive electrical system of claim 12, wherein the processor is configured such that the applying of each of the first plurality of switching vectors and the applying of each of the second plurality of switching vectors comprises:
activating a first portion of the plurality of switches; and
deactivating a second portion of the plurality of switches.

14. The automotive electrical system of claim 13, wherein the applying of each of the first magnitude switching vectors causes a first voltage to be applied across at least one winding of the at least five windings, the applying of each of the second magnitude switching vectors causes a second voltage to be applied across the at least one winding of the at least five windings, and the first voltage is greater than the second voltage.

15. The automotive electrical system of claim 14, wherein the inverter is configured to apply third magnitude switching vectors to the plurality of switches, the third magnitude switching vectors corresponding to a third voltage being applied across the at least one winding of the at least five windings, and wherein the third voltage is less than the second voltage.

16. An automotive propulsion system comprising:
an electric motor comprising at least five windings;
a direct current (DC) voltage supply;
a direct current-to-alternating current (DC/AC) power inverter comprising at least five pairs of power switching devices coupled to the at least five windings and the DC voltage supply; and
a processor in operable communication with the electric motor, the DC voltage supply, and the DC/AC power inverter, the processor being configured to:
apply a first plurality of switching vectors to the at least five pairs of power switching devices, the first plurality of switching vectors comprising a first ratio of first magnitude switching vectors to second magnitude switching vectors;
select a second ratio of the first magnitude switching vectors to the second magnitude switching vectors based on a DC current associated with the DC voltage supply; and
apply a second plurality of switching vectors to the at least five pairs of power switching devices, the second plurality of switching vectors comprising the second ratio of the first magnitude switching vectors to the second magnitude switching vectors.

17. The automotive propulsion system of claim 16, wherein the first plurality of switching vectors corresponds to a first plurality of voltage vectors on a stationary frame of reference coordinate system, and the second plurality of switching vectors corresponds to a second plurality of voltage vectors on the stationary frame of reference coordinate system.

18. The automotive propulsion system of claim 17, wherein the applying of each of the first magnitude switching vectors causes a first voltage to be applied across at least one winding of the at least five windings, the applying of each of the second magnitude switching vectors causes a second voltage to be applied across the at least one winding of the at least five windings, and the first voltage is greater than the second voltage.

19. The automotive propulsion system of claim 18, wherein the inverter is configured to apply third magnitude switching vectors to the at least five pairs of power switching devices, the third magnitude switching vectors corresponding to a third voltage being applied across the at least one winding of the at least five windings, and wherein the third voltage is less than the second voltage.

20. The automotive propulsion system of claim 19, wherein the processor is configured such that the second ratio of the first magnitude switching vectors to the second magnitude switching vectors is approximately 3:1.

* * * * *